United States Patent [19]

Beaton

[11] Patent Number: 4,818,630
[45] Date of Patent: Apr. 4, 1989

[54] SEAMLESS ORIENTED METAL FIBER STRUCTURE

[75] Inventor: Michael S. Beaton, DeLand, Fla.

[73] Assignee: Brunswick Corporation, Skokie, Ill.

[21] Appl. No.: 714,946

[22] Filed: Mar. 22, 1985

[51] Int. Cl.$^4$ .............................................. B23P 17/06
[52] U.S. Cl. ........................................ 428/605; 419/24
[58] Field of Search ............... 428/605, 567, 608, 610, 428/613; 419/24

[56] References Cited

U.S. PATENT DOCUMENTS

| | | | |
|---|---|---|---|
| 1,620,530 | 3/1927 | Field | 428/605 |
| 2,577,187 | 12/1951 | Fox | 428/567 |
| 3,165,826 | 1/1965 | Bentov | 419/24 |
| 3,178,280 | 4/1965 | McGee et al. | 419/24 |
| 3,390,750 | 7/1968 | Albertson | 428/605 |
| 3,713,787 | 1/1973 | Kuniyasu et al. | 428/605 |
| 4,381,197 | 4/1983 | Liebermann | 419/24 |

OTHER PUBLICATIONS

"Metal Fiber Composites", M. Sabanas, *Product Engineering*, May 30, 1960, pp. 57–61.
"New Techniques Adapted to Fiber Metallurgy", *C&EN*, Feb. 11, 1963, p. 49.
"Fiber Metals—A New Metal Form", Metcalfe et al., *Materials and Methods*, Nov. 1955, pp. 96–98.
"Fiber Metallurgy", Metcalfe et al., *Metal Progress*, Mar. 1955, pp. 81–84.

Primary Examiner—John J. Zimmerman
Attorney, Agent, or Firm—Art Greif

[57] ABSTRACT

A tube-like, abradable seal, exhibiting superior abradability and gas flow blockage, is produced by laying metal fibers into an open-ended annular die such that the fibers are oriented substantially perpendicular to the longitudinal axis of the tubular die. The fibers are thereafter compressed within the die and sintered to achieve a strong abradable seal.

6 Claims, 3 Drawing Sheets

CROSS SECTION OF GRADED DENSITY MOLDED
SEAMLESS SEAL ANALOG OF FM515B BACKING
RING IS SHOWN FOR ORIENTATION REFERENCE
100X

CROSS SECTION OF CONVENTIONAL FM515B SEAL
BACKING RING IS SHOWN FOR ORIENTATION REFERENCE
100X

CROSS SECTION OF GRADED DENSITY MOLDED
SEAMLESS SEAL ANALOG OF FM515B BACKING
RING IS SHOWN FOR ORIENTATION REFERENCE
100X

↓ DIRECTION OF COMPRESSION

↓ AIR FLOW

MICROSTRUCTURE OF "TOP" ZONE OF SEAL NEAREST THE PRESSING RING. RELATIVELY HORIZONTAL FIBER ORIENTATION
100X

↓ DIRECTION OF COMPRESSION

↓ AIR FLOW

MICROSTRUCTURE OF MIDDLE ZONE OF SEAL RELATIVELY RANDOM ORIENTATION OF FIBERS
100X

SEAMLESS ORIENTED METAL FIBER STRUCTURE

BACKGROUND OF THE INVENTION

1. Field of the Invention

This invention relates to metal fiber structures and more particularly to molded metal fiber structures.

2. Description of the Prior Art

Abradable seals made from metal fibers have been used to seal various areas in rotary compressors and in turbine engines and their compressor sections, including the space between the turbine blade tips and the engine housing and the space between the turbine shaft and the turbine vanes.

These seals must provide sufficient abradability, gas flow blockage and erosion resistance. Increasing density enhances erosion resistance and gas flow blockage but it adversely affects abradability. Similarly, increasing tensile strength enhances erosion resistance, but adversely affects abradability.

The prior art seals are fabricated by working with a flat brittle porous sheet of sintered metal fibers. The sheet is cut to size and a reinforcing backing is welded to it or it is brazed into a ring. An undesirable "butt joint" results in the ring seal due to the welding or brazing operations. In these prior art seals there is a random orientation of the fibers in the porous sheet which cannot be changed once the sheet is formed. Also, the density throughout the sheet and hence throughout the resulting seals is substantially uniform.

SUMMARY OF THE INVENTION

According to the present invention the fibers are charged directly into a pre-shaped mold of a desired configuration. The fibers are then compressed and heat treated while still in the mold.

The compression of the fibers in the mold also produces a gradation in the density along the direction of compression. The density is greatest near the compressing member. Increased density portion of the seal is desirable for providing more effective fluid blockage while decreased density is desirable for areas in which enhanced abradability is desired without compromising gas flow blockage. By combining a plurality of green unsintered compressed elements at different points in the mold, desired density areas different from other areas may be produced.

The fiber metal structures produced according to the present invention have no seams, require no brazing of sheet ends, and are easier to make than prior art structures.

The ability to heat treat the seals or other fiber metal structures while they are still in a mold eliminates many handling steps and also permits the use of weights on the mold to control density and to prevent expansion during heating operations.

The prior art seals, since they are manufactured in sheet form, are characterized by two "strength directions": (i) the tensile strength measured in any direction within and parrallel to the plane of the sheet. (ii) the tensile strength perpendicular to the plane of the sheet.

The seals of the present invention are manufactured in annular configuration rather than in sheet form. The resultant tube-like seals may have any particular annular configuration including but not limited to a hollow cylinder, a hollow conic section, or a toroidal section. These seals can be characterized by three "strength directions"; radial, axial, and circumferential. Thus, one of the great advantages of this invention is the ability to preselect the tensile strength in the axial circumferential, and radial directions and make them different or the same, as desired.

DESCRIPTION OF PREFERRED EMBODIMENTS

Figure 1:
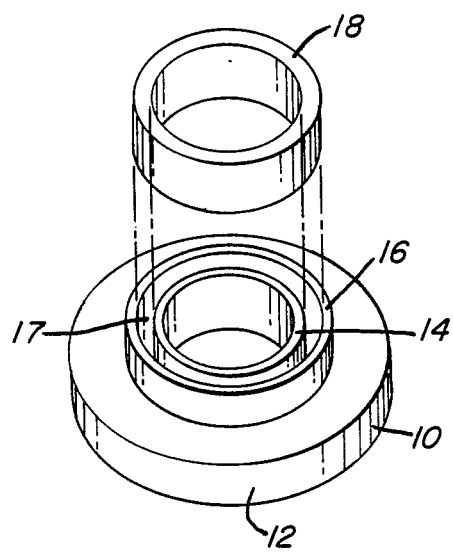
FIG. 1 is a perspective view of a compression fixture according to the present invention.
Figure 3:
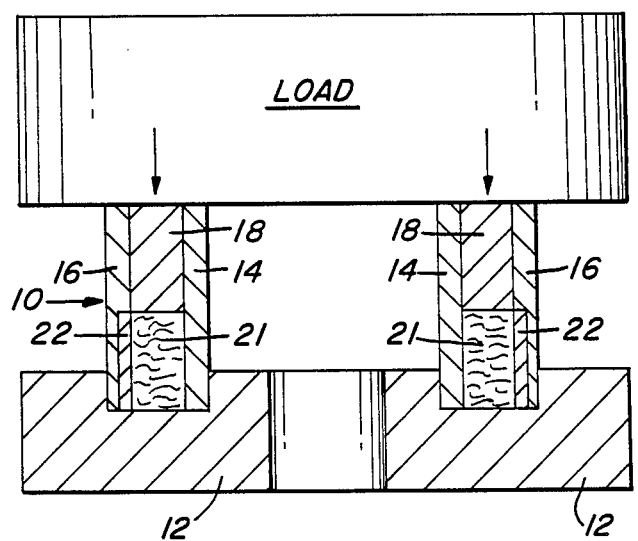
FIG. 3 is a schematic depiction in cross-section of a compression fixture according to the present invention with the compression ring inserted in the fixture for making a seal such as shown in FIG. 2.

As shown in FIG. 1 one embodiment of a compression fixture 10 according to the present invention has the baseplate 12, the inner cylinder 14, the outer cylinder 16, and the compression ring 18. All of these parts are precisely sized so that the compressing ring 18 will fit into the cavity 17 between the two cylinders 14, 16 which are secured to the baseplate 12. FIG. 3 shows the portion that is cut out of the outer cylinder 16 to accommodate a solid backing ring 22 to which the seal to be produced can be attached or bonded during processing. Metal fibers 21 are introduced into the cavity 17 between the cylinders 14 and 16. The compression ring 18 is then pressed down on the fibers 21 forcing them further into the cavity 17 and into the area encircled by the ring 22. A fiber mass or seal of a desired density can be produced by introducing a known weight of fiber into the cavity 17, measuring its height, calculating the height of the mass at the desired density, and compressing the mass to that height.

Figure 2:
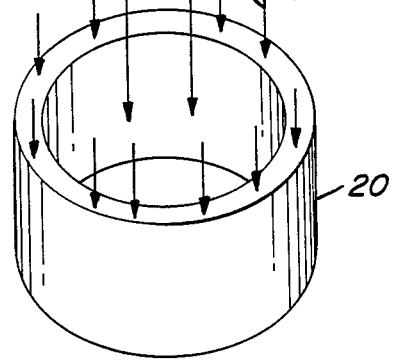
FIG. 2 is a schematic depiction of a fiber metal seal made with the fixture of FIG. 1.

The metal fibers 21 used for the embodiment shown in FIGS. 1, 2, and 3 are of random irregular geometry with a relatively high aspect ratio of about 75 ("aspect ratio" means ratio of fiber length to fiber diameter). The normal bulk density of a mass of such fibers is about 10% (or a porosity of 90%), which is too low for the gas flow blockage and erosion resistance required of an abradable seal. By densifying the mass or body of fibers in a compression fixture such as fixture 10, the required density results. "Density" is expressed here in percentage and means the ratio of material in a given volume compared to 100% solid material in the same volume.

In order to maximize gas flow blockage the fibers 21 are compressed in the direction of the gas flow to be encountered by the seal. The seal 20, in FIG. 2, has had its fibers in the mass densified by a compression ring moving in the same direction as the indicated gas flow direction. The random irregular fibers used to form the seal 20 tend to accumulate in a random spatial orientation in planes parallel to the plane of deposition.

Figure 4:
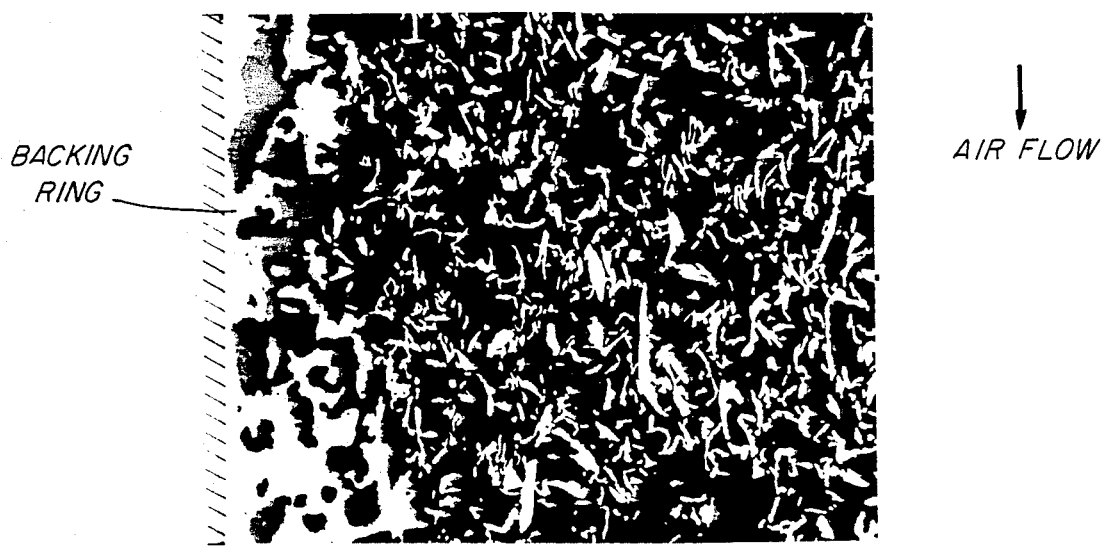
FIG. 4 is a photomicrograph at 100×magnification of a cross-section of a conventional seal.
Figure 5:
FIG. 5 is a photomicrograph at 100×magnification of a cross-section of a seal according to the present invention.

The axial compression according to the present invention causes the fibers to be re-oriented toward planes perpendicular to the direction of compression. This re-orientation, although difficult to quantify, is readily apparent upon a visual examination of a compressed product and is shown clearly in the photomicrograph of FIG. 5. A section cut from a prior art seal ring is depicted in the photomicrograph shown in FIG. 4 wherein the backing metal portion of the ring is shown on the left-hand side of FIG. 4 in the vertical direction and the airflow through the seal ring is depicted by the arrow on the right-hand side indicating that the airflow through the seal is also in the vertical direction. As can be seen, the fibers are generally randomly oriented with more of the fibers in the vertical direction which was the direction of formation of the prior art sheet prior to forming the seal ring. A section cut from one of the embodiments of this invention is depicted in the photomicrograph of FIG. 5 wherein the backing ring is shown in a vertical position on the left-hand side of the figure and the airflow is depicted by the arrow on the right-hand side of the figure. The fibers in this embodiment are generally oriented perpendicular to the backing ring and thus perpendicular to the airflow. The fibers were compressed perpendicular to the base as well as perpendicular to the airflow direction as shown in FIG. 5. In other words, the compression is parallel to the airflow and perpendicular to the backing ring, thus providing flow impedance to the airflow through the seal and thereby making the turbine more efficient.

The orientation of the fibers results in enhanced abradability as compared to conventional seals. The rubbing interaction between rotating turbine elements and axially compressed fibers according to the present invention can be effected with acceptable results under more stringent test conditions than for conventionally processed materials. Under comparable conditions knife edge rub of a seal of 18% nominal density according to the present invention dissipated only 6 K ft lb in $^{-3}$ (Kilo foot pounds per cubic inch) of energy units while a similar prior art seal formed of typical sheet fiber metal consumed 138 K ft lb in $^{-3}$ energy units.

Fibers can be introduced into the cavity 17 in a variety of ways including hand sifting, hand sifting through a hand-held sieve, and hand sifting through a hand-held sieve held over a funnel which is inserted into the cavity.

Surprisingly, axial compression of the fiber mass in the cavity 17 has produced a remarkable density gradient effect in the final product which is not present in prior art structures made from slurry-produced sheets of fiber metal. The density of the compressed fiber mass is greatest near the area which is contacted by the compression ring (the "top"). The density of the mid-portions is less than that of the top portion and the density of the portions which were located near the base plate (the "bottom") is greater than the density of the mid-portions yet slightly less than the top portions' densities.

The density gradient effect can be modified by varying compression parameters and modes of fiber introduction into the cavity. A variety of techniques can be used to deposit fibers into the fixture cavity. For example all of the fibers can be introduced into the cavity prior to any compression or portions of the total fiber mass can be introduced and compressed in separate steps to form a structure with varying or alternating density portions.

Figure 6:
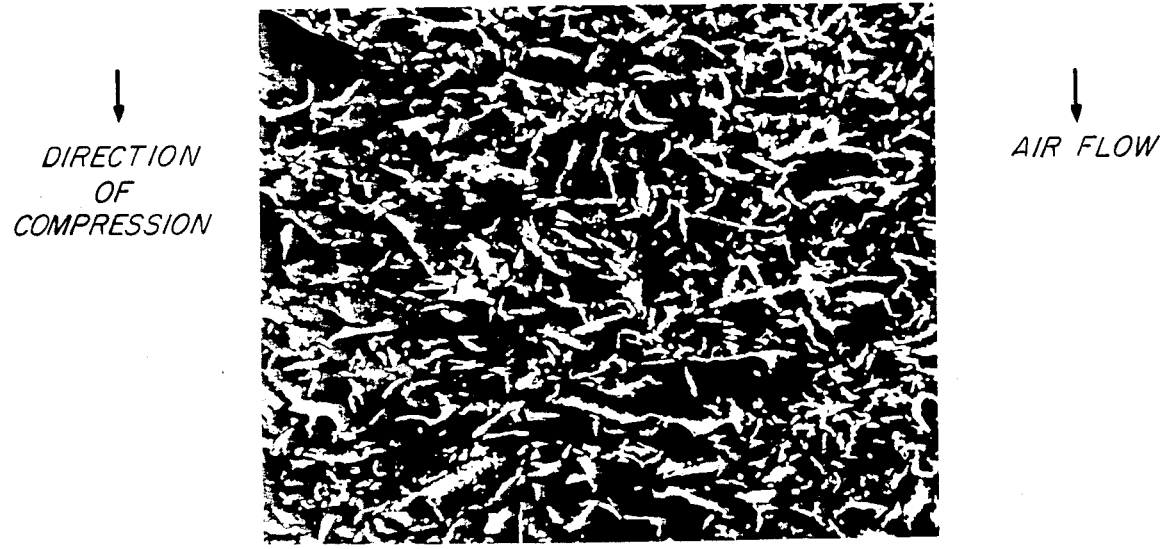
FIG. 6 is a photomicrograph at 100×magnification of a cross-section of a seal according to the present invention, the section taken through the part of the seal which in manufacture was near the compression ring.
Figure 7:
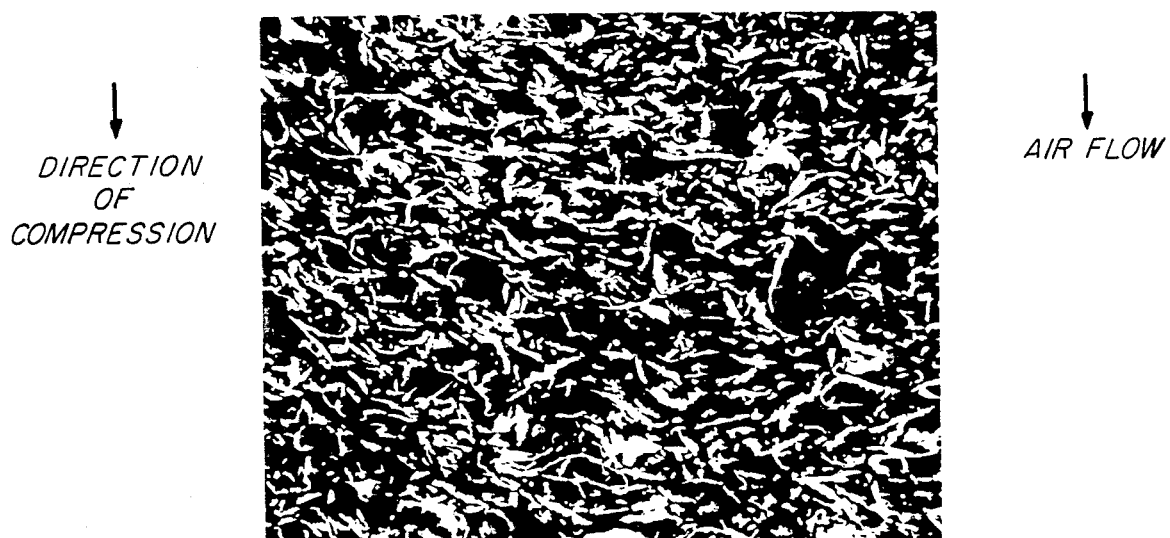
FIG. 7 is a photomicrograph at 100× magnification of the middle of the seal of FIG. 6.

The photomicrographs of FIGS. 6 and 7 illustrate visually the density gradient across a seal made with a fixture such as that of FIG. 1. FIGS. 6 and 7 show portions of a molded seamless seal according to the present invention. The densities of the two portions vary. Relative quantification of the densities was acheived by using the reciprocal of the exposure time for each photomicrograph with illumination held constant to establish a relative areal concentration of fibers in each portion of the seal. The cross-sectional portion of the embodiment depicted in FIGS. 6 and 7 is arranged in such a manner that the microstructure shown in FIG. 6 has an airflow in the vertical direction through the material and the direction of the compression of the fibers was also in the vertical direction. It can be seen in the photograph that the preferred orientation of the fibers is in a horizontal arrangement perpendicular to both the airflow and the direction of compression. The midsection or middle zone of the seal material represented by the photomicrograph of FIG. 7 shows the fibers having less density than the fibers in FIG. 6 while the airflow and direction of compression are the same as shown in FIG. 6. It is also obvious from the photograph that besides the density being less than is shown in FIG. 6 the fibers are more in a random array than the more horizontally oriented fibers in FIG. 6.

The combination of a fiber-charged fixture with a compressing load such as is shown in FIG. 3 can be introduced into a heat treatment unit, e.g., a sintering furnace. The load on the fiber mass restricts expansion during heating assuring that the resultant structure will have the desired dimensions and eliminating the need for time-consuming sizing and trimming. This method also obviates the need for multiple heat treatment steps because the fibers are joined together by sintering in a mass of the size and shape of the final product, and the mass is joined to its backing ring by brazing simultaneously or in the same operation; thus requiring only one heat-treat operation. Also the hot deformation step required to permit work with low ductility materials such as materials containing nickel aluminides is no longer necessary with the present invention. Furthermore, intimate contact in the fiber mass in the fixture cavity is achieved *before* sintering making it possible to more closely meet prescribed size tolerances. Finally, products made according to the present invention have no seam. Prior art products with seams are undesirable because such seams present a path for low gas flow resistance.

Reduced gas flow, i.e., reduced permeability, is a result of the density gradient and fiber orientation of products made according to the present invention. For a given gas and a given porous material under steady state flow conditions, the permeability coefficient is inversely related to the pressure drop of the material at constant air flow; put another way, the permeability coefficient is directly related to the air flow rate at constant pressure drop. As fractional density of the material increases, the permeability coefficient decreases and, at a given pressure drop, actual gas flow decreases. For this reason, incorporation of a higher density region in an abradable gas path seal decreases flow through the seal. Tests have shown that the gas flow blockage of a seal according to the present invention is approximately 100% greater than a conventional seamed seal and approximately 60% greater than a conventional seamed seal in which the seam has been treated to block flow through it.

A porous metal fiber structure exhibits an anisotropic character for gas permeability. Permeability parallel to the felting plane ("felting plane" is the plane of the porous membrane on which the sheet of fibers is deposited) of conventionally produced fiber metal structures can be up to twice as great as permeability perpendicular to this plane. The methods of and means of the present invention effectively invert this relationship because the felting plane of a product produced according to the present invention is perpendicular to the direction of the fluid that will flow through the structure. The fiber orientation pattern of structures and seals according to this invention enhances abradability, reduces axial fluid leakage through the seal, increases erosion resistance and improves strength in the radial direction.

The porous metal fiber body described herein has a structure made up of the plurality of discrete metal fibers, each of these metal fibers having a generally uniform diameter or cross section along the length of the fiber with the fibers having a minimum diameter of about 3 microns and up to a maximum diameter of about 145 microns. The maximum fiber diameter in any one body is no more than about four times the minimum fiber diameter of a fiber found in the same body. Included within the scope of this invention is the requirement that the fibers within a body have a minimum length of at least about 30 microns and a maximum length no more than about 7,620 microns and the individual fibers have a length to diameter ratio ranging from at least about 10 to 1, to no more than about 180 to 1. The adjacent fibers within the body that are touching exhibit interfiber diffusion bonding such that a meniscus between the touching adjacent fibers is formed and that the total fiber bonding produces a lattice network of autogenously bonding or diffusion bonded fibers, one to the other. It has been found that the maximum density of this fiber network is no more than abut 70% and no less than about 12%. The fiber network can have a greater density such that the maximum density of the network is no more than about 50% greater than the minimum density of the network and that the difference between the minimum and maximum densities should be at least about 25%. It has been found that within the fiber network the highest density range has a tensile strength profile such that the lowest tensile strength, by direction, ranges from about 50 to 65% of the maximum tensile strength and that the intermediate tensile strength ranges from about 65 to 85% of the maximum tensile strength. Further, it has been found that the portion of the lowest density area of the network has a three dimensional tensile strength profile such that all three directions have approximately equal tensile strengths.

Figure 8:
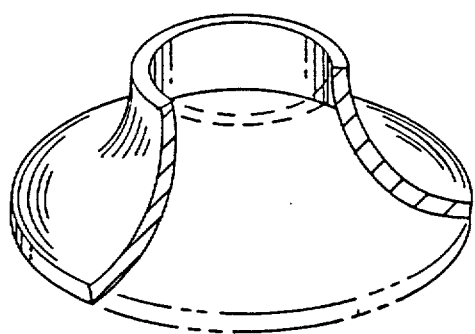
FIGS. 8, 9, and 10 depict solids of revolution according to the present invention.
Figure 9:
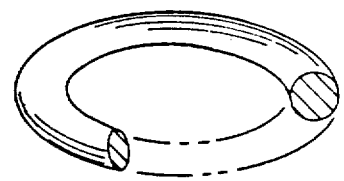
Figure 10:
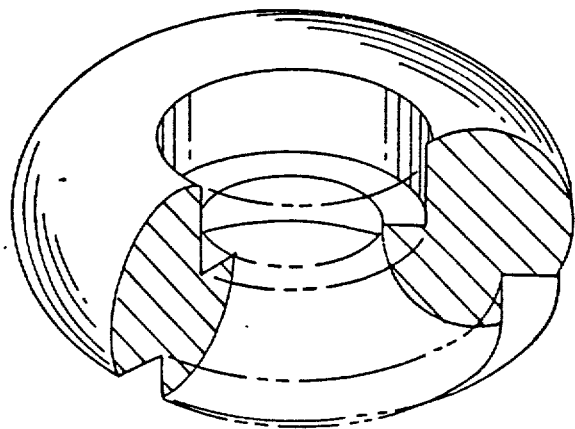

Although the description above has been directed to a tube-like object in the form of a right circular cylinder, it should be evident that the instant invention is not limited thereto. For example, tubelike objects, such as shown in FIGS. 8–10, can readily be produced, having the controlled fiber orientation of this invention.

What is claimed is:

1. A process for making a tube-like abradable metal fiber seal exhibiting superior abradability and gas flow blockage, comprising:
   felting discrete metal fibers into a tube-like recess in a fixture, the feltig done in planes perpendicular to the longitudinal axis of the recess, the fixture having only one open end with the recess formed of that open end, said fibers having a diameter of 3 to 145 microns, a length of 30 to 7,620 microns, and a length to diameter range of 10 to 180, compressing the fibers in the recess by applying pressure in a direction coincident with the recess's longitudinal axis to compress the fibers into a lattice network having a density 12 to 70%, heating the fibers to produce interdiffusion bonding between a majority of adjacent fibers.

2. The process of claim 1, in which said tube-like recess is in the form of a right circular cylinder.

3. The process of claim 2, in which a predetermined height of the outer circumferential surface of said recess is fitted with tubular backing ring, such that said backing ring may bond to the metal fiber seal during the heating of the fibers.

4. A tube-like, metal fiber abradable seal exhibiting superior abradability and gas flow blockage, characterized by said fibers being oriented substantially perpendicular to the longitudinal axis of the seal, said seal having been produced by the process of claim 1.

5. The seal of claim 4, produced by the process of claim 2.

6. The seal of claim 5, produced by the process of claim 3.

* * * * *

UNITED STATES PATENT AND TRADEMARK OFFICE
CERTIFICATE OF CORRECTION

PATENT NO. : 4,818,630

DATED : April 4, 1989

INVENTOR(S) : Michael S. Beaton

It is certified that error appears in the above-identified patent and that said Letters Patent is hereby corrected as shown below:

The Drawing sheet consisting of Figures 8 - 10 should be added as per attached sheet.

Signed and Sealed this

Thirty-first Day of October, 1989

Attest:

Attesting Officer

DONALD J. QUIGG

Commissioner of Patents and Trademarks